United States Patent [19]

Swaniger et al.

[11] 4,061,044

[45] Dec. 6, 1977

[54] METER SETTING INDEXING GEAR APPARATUS

[75] Inventors: James R. Swaniger, Bridgeport; Keith E. Schubert, Rowayton, both of Conn.

[73] Assignee: Pitney-Bowes, Inc., Stamford, Conn.

[21] Appl. No.: 712,379

[22] Filed: Aug. 6, 1976

[51] Int. Cl.[2] .............. F16H 19/04

[52] U.S. Cl. .............. 74/31

[58] Field of Search .............. 74/30, 31, 89.11, 89.12, 74/422, 424.6, 71, 72, 318

[56] References Cited

U.S. PATENT DOCUMENTS

| | | | |
|---|---|---|---|
| 1,234,824 | 7/1917 | Tatum | 74/30 |
| 1,316,437 | 9/1919 | Flood | 74/30 |
| 3,337,806 | 8/1967 | Oppenheimer et al. | 74/30 |

*Primary Examiner*—Samuel Scott
*Assistant Examiner*—Wesley S. Ratliff, Jr.
*Attorney, Agent, or Firm*—Robert S. Salzman; William D. Soltow, Jr.; Albert W. Scribner

[57] ABSTRACT

A postage meter conversion apparatus is disclosed that will convert a mechanical, lever operated postage meter into an electrically controlled postage meter. The conversion apparatus is easily assembled and disassembled from a standard lever operated postage meter. Each lever of the meter is operated in a sequential manner. The conversion apparatus is so constructed that only one lever of the meter can be actuated at any time in the sequence. The conversion apparatus can be used to make the mechanical meter compatible in an electrical environment containing equipment such as a computer, a digital scale, and other postage system processing devices.

10 Claims, 2 Drawing Figures

METER SETTING INDEXING GEAR APPARATUS

This invention pertains to postal equipment, and more particularly to a conversion unit for making a standard mechanical postage meter compatible in an electrical environment.

BACKGROUND OF THE INVENTION

With more and more processing equipment becoming electrically controlled, a need is emerging for converting mechanical postal systems and equipment to electrical control.

Because present federal law prevents the direct electrical redesign of a postage meter, the invention concerns itself with the logical alternative, viz., a conversion attachment.

While conversion attachments are not new per se, the present invention features a novel mechanism packaged as a unit which provides ease of adaptability, assembly, reliability and low cost of manufacture.

SUMMARY OF THE INVENTION

The invention relates to a postage meter conversion apparatus for converting a lever operated mechanical postage meter to an electrically controlled postage meter.

The invention conversion unit comprises a rotatably mounted master pinion gear, that sequentially engages with a number of racks. Each rack has an arm that is operatively connected to a lever of a respective meter bank. A stepper motor drives the pinion gear and causes each engaged rack to move, and hence, each lever to move.

The pinion gear is indexed to sequentially engage each rack by means of two transversely operative systems. A first system positions the pinion gear between a first and second position. A second system positions the master pinion gear between a third and fourth position. The movement of the gear between the first and second positions is transverse to the movement of the gear between the third and fourth positions.

The advantage of the present conversion apparatus is that it is very compact and can be easily packaged into a small unit for mounting upon a postage meter.

The conversion unit is easily assembled to, and disassembled from, the postage meter. The conversion apparatus allows the mechanical meter to be electrically controlled by a computer or a digital scale, etc.

It is an object of this invention to provide an improved conversion apparatus for operating a mechanical postage meter by electrical control;

It is another object of the invention to provide a conversion unit for a postage meter which is easy to assemble;

It is a further object of this invention to provide a reliable low cost conversion unit for electrically controlling a standard mechanical postage meter.

These and other objects of the invention will become more apparent and will be better understood with reference to the following detailed description taken in conjunction with the attached drawings, in which:

FIG. 1 is a perspective in situ view of the conversion apparatus of the invention mounted upon a postage meter; and FIG. 2 is a front view of the conversion apparatus shown in FIG. 1.

DETAILED DESCRIPTION

Figure 2:
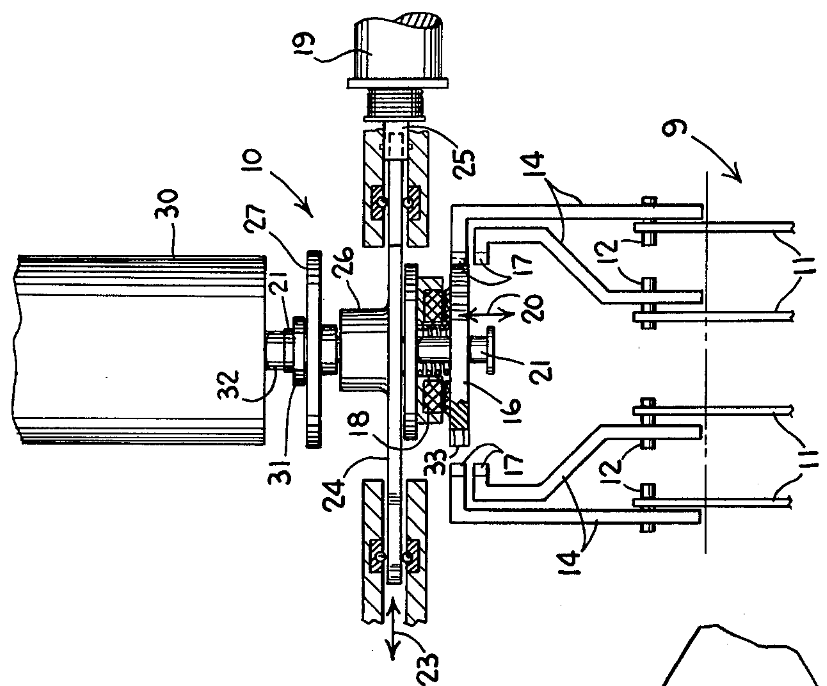
Figure 1:
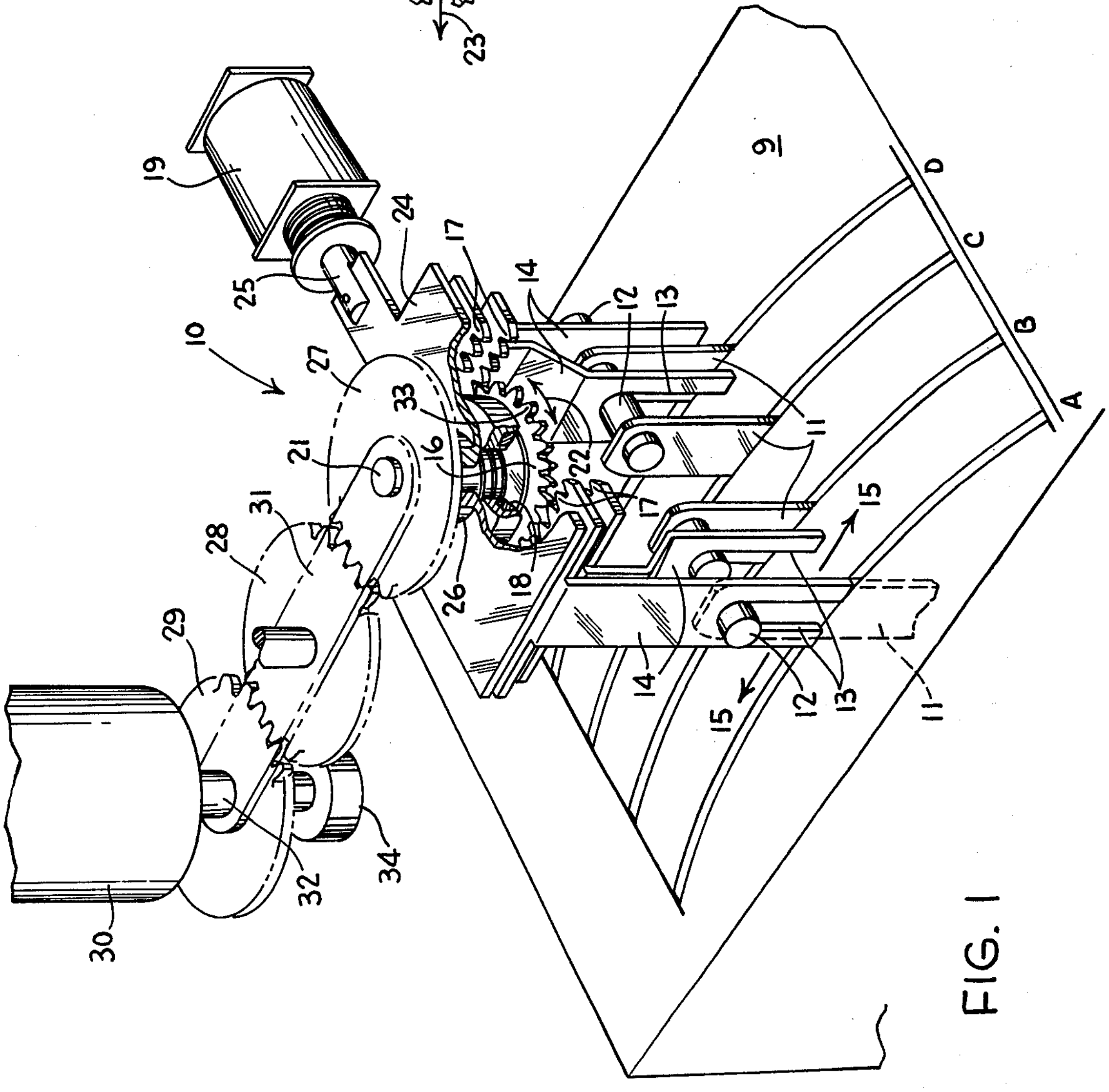

Now referring to FIGS. 1 and 2, a standard lever operated postage meter 9 is shown supporting the inventive conversion apparatus shown generally by arrow 10. The postage meter is one of a standard issue, and known commercially as one belonging to the 5300 Model Series, manufactured by Pitney Bowes, Inc., Stamford, Conn.

The postage meter 9 has a plurality of meter banks, generally indicated by the letters designated "A", "B", "C" and "D". Naturally fewer or a greater number of meter banks can be adapted to the conversion apparatus. Each bank of the postage meter 9 is set by a lever 11. Each lever 11 will set a postage value in its respective bank from "0" to "9". Therefore, a postage meter having four banks, as illustrated in the present case, will be settable to a maximum of $99.99.

The conversion apparatus 10 of this invention is connected to the levers 11 of postage meter 9 by means of pin members 12. The respective pins 12 ride up and down within slots 13 of each of the actuating arms 14 of the conversion apparatus, as the respective levers 11 are caused to move. This is a result of matching the arcuate movement of the levers 11, with the straight-line lateral movement (arrows 15) of the actuating arms 14. In other words, the pin 12 and slot 13 arrangement, allows for the vertical displacement of levers 11 with respect to arms 14.

The actuating arms 14 for each bank are caused to move laterally (arrows 15) by means of a master pinion gear 16. The pinion gear 16 sequentially engages with each actuating arm 14, via racks 17 which form part of the actuating arm members 14.

The master pinion gear 16 is indexed into four separate positions, engaging with each rack 17 by means of the electromagnet 18 and the solenoid 19. The electromagnet 18 will cause the pinion gear to move up and down (arrows 20) on shaft 21 between an upper rack engaging position and a lower rack engaging position respectively (see FIG. 2). Gear 16 is free to move up and down on shaft 21 (arrows 20) which is a splined shaft keyed to gear 16) while rotatively affixed thereto.

When engaged with a respective rack 17, the pinion gear 16 is caused to rotate (arrows 22 of FIG. 1).

As will be seen, gear 16 must also move laterally (arrows 23 in FIG. 2) between a third and fourth rack engaging position to provide engagement with each of the four racks 17. This is accomplished by actuating (or deactuating) solenoid 19. A table 24 attached to the plunger 25 of the solenoid 19, will be caused to move transversely (arrows 23) of the other aforementioned gear movement (arrows 20). The gear 16 and electromagnet 18 are mounted to table 24 as a unit and are movable therewith. Shaft 21 extends through table 24 via collar 26 and is affixed to drive gear 27 for rotation therewith.

Gear 27 is rotatively driven by an intermediate gear 28 (FIG. 1), which in turn is rotated by gear 29. These gears are powered by stepper motor 30, which is rotatively fixed to gear 29 as shown.

When the table 24 is caused to move in either lateral direction (arrows 23) gear 16 will also move, because the gear 16 and the electromagnet 18 are mounted to table 24 as a unit, as aforementioned.

The gear 16 will always remain in rotative engagement with the motor 30, because when the table 24 is laterally shifted, gear 27 will remain in rotative contact with intermediate gear 28. This will be seen to be so, because gears 27, 28, and 29, are respectively tied together by cross-bar 31. Therefore, as the table 24 is shifted, gear 27 rotates about gear 28, which in turn pivots the cross-bar 31 about the motor shaft 32. Naturally, as all of this is happening, gear 28 will rotate about gear 29 which is rotatively fixed about shaft 32.

Gear 16 will be made of magnetically attractive material such as iron, so that it will be attracted to the electromagnet 18 when it is actuated. When so attracted, gear 16 will move upward upon splined shaft 21, as aforementioned. The teeth 33 of gear 16 are designed with taper, so that they will easily engage with the teeth of racks 17, when gear 16 is caused to move up and down.

Also, the taper of the teeth 33 must be correctly designed to allow for the vertical engagement (arrows 20) of gear 16 with each rack 17.

A slip clutch 34 is provided for the motor 30 to prevent the motor from burning out if the drive mechanism should jam.

Having thus described the invention, it will be understood by the skilled practitioner that other arrangements of a fewer or a greater number of banks can be accommodated by adding or subtracting a number of racks, and also supplying a fewer or a greater number of gear 16 positions.

These and other modifications are deemed to be within the scope and limits of the invention, the spirit of which is represented by the appended claims.

What is claimed is:

1. The combination of a lever operated mechanical postage meter having a number of levers to set postage, and a conversion apparatus for converting the mechanical postage meter into an electrically controlled postage meter, the combination further comprising:

- a rotatably mounted, movably adjustable master pinion gear for sequential engagement with a plurality of racks;
- a number of racks, each for sequential engagement with said master pinion gear, one rack for each respective meter bank, each rack having an arm operatively connected to a lever of a respective meter bank;
- a pivotable drive means operatively connected to said master pinion gear for rotating said master pinion gear to cause each of said racks to move when engaged with said master pinion gear; and
- indexing means connected to said master pinion gear for sequentially engaging said master pinion gear with each of said racks.

2. The combination postage meter and conversion apparatus of claim 1, wherein said indexing means comprises an electromagnet operatively connected to said master pinion gear for moving said master pinion gear between a first rack engaging position, and a second rack engaging position.

3. The combination postage meter and conversion apparatus of claim 2, wherein said indexing means further comprises a solenoid operatively connected to said master pinion gear for moving said master pinion gear between a third rack engaging position, and a fourth rack engaging position.

4. the combination postage meter and conversion apparatus of claim 3, wherein the movement of the master pinion gear between said first and second rack engaging positions is transverse to the movement of the master pinion gear between the third and fourth positions.

5. The combination postage meter and conversion apparatus of claim 1, wherein said drive means comprises a stepper motor operatively connected to said master pinion gear.

6. a conversion apparatus for converting a mechanical lever operated postage meter into an electrically controlled postage meter, said conversion apparatus comprising:

- a rotatably mounted movably, adjustable master pinion gear for sequential engagement with a plurality of racks;
- a number of racks, each for sequential engagement with said master pinion gear, one rack for each respective meter bank, each rack having an arm operatively connected to a lever of a respective meter bank;
- a pivotable drive means operatively connected to said master pinion gear for rotating said master pinion gear to cause each of said racks to move when engaged with said master pinion gear; and
- indexing means connected to said master pinion gear for sequentially engaging said master pinion gear with each of said racks.

7. The conversion apparatus of claims 6, wherein said indexing means comprises an electromagnet operatively connected to said master pinion gear for moving said master pinion gear between a first rack engaging position, and a second rack engaging position.

8. The and conversion apparatus of claim 7, wherein said indexing means further comprises a solenoid operatively connected to said master pinion gear for moving said pinion gear between a third rack engaging position, and a fourth rack engaging position.

9. The conversion apparatus of claim 8, wherein the movement of the master pinion gear between said first and second rack engaging positions is transverse in direction to the movement of the master pinion gear between the third and fourth positions.

10. The conversion apparatus of claim 6, wherein said drive means comprises a stepper motor operatively connected to said master pinion gear.

* * * * *

UNITED STATES PATENT AND TRADEMARK OFFICE

CERTIFICATE OF CORRECTION

PATENT NO. : 4,061,044

DATED : December 6, 1977

INVENTOR(S) : James R. Swaniger - Keith E. Schubert

It is certified that error appears in the above-identified patent and that said Letters Patent are hereby corrected as shown below:

Column 3, line 13, before the word "taper" insert the word --a--.

Claim 7, line 1, change "claims" to --claim--.

Signed and Sealed this

*Sixteenth* Day of *May 1978*

[SEAL]

*Attest:*

RUTH C. MASON
*Attesting Officer*

LUTRELLE F. PARKER
*Acting Commissioner of Patents and Trademarks*